United States Patent
Okuyama et al.

(10) Patent No.: US 9,624,975 B2
(45) Date of Patent: Apr. 18, 2017

(54) SLIDING MEMBER AND SLIDING MACHINE

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Masaru Okuyama, Nagakute (JP); Mamoru Tohyama, Nagakute (JP); Hiroyuki Mori, Nagakute (JP); Munehisa Matsui, Nagakute (JP); Naoya Ikeda, Toyota (JP); Yoshio Fuwa, Toyota (JP); Takatoshi Shinyoshi, Toyota (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 14/644,942

(22) Filed: Mar. 11, 2015

(65) Prior Publication Data

US 2015/0267746 A1    Sep. 24, 2015

(30) Foreign Application Priority Data

Mar. 21, 2014 (JP) .................................. 2014-059342

(51) Int. Cl.
*F16C 33/04* (2006.01)

(52) U.S. Cl.
CPC ........ *F16C 33/043* (2013.01); *F16C 2206/58* (2013.01)

(58) Field of Classification Search
CPC .................................................. F16C 33/043
(Continued)

(56) References Cited

U.S. PATENT DOCUMENTS 7,458,585 B2 * 12/2008 Hamada ............... C10M 141/10
                                                     277/310
7,537,835 B2 *  5/2009 Mori ....................... F16C 33/12
                                                     428/336
(Continued)

FOREIGN PATENT DOCUMENTS

DE       10005612 A1    8/2001
JP     H05-208806 A     8/1993
(Continued)

OTHER PUBLICATIONS

Aug. 25, 2016 Office Action issued in German Patent Application No. 10 2015 105 103.0.
(Continued)

*Primary Examiner* — Ellen McAvoy
(74) *Attorney, Agent, or Firm* — Oliff PLC

(57) ABSTRACT

The sliding member according to the present invention includes: a base material; and a sliding film that covers a surface of the base material and constitutes a sliding surface, and is used under a wet condition where lubricant oil exists. The sliding film according to the present invention is a laminated film that includes: an underlying layer formed on the surface of the base material; and an outermost layer formed at least on a part of the underlying layer. This outermost layer is characterized by including specific boron-containing amorphous carbon (specific B-DLC) that contains 4-50% B and 5-50% H when the outermost layer as a whole is 100 at %. This specific B-DLC itself wears away during the sliding to smooth the sliding surface, and an excellent low friction property is exhibited. The underlying layer of the specific B-DLC contributes to improvement in the wear resistance property of the sliding film.

8 Claims, 13 Drawing Sheets

(58) Field of Classification Search
USPC .......................................................... 508/107
See application file for complete search history.

(56) References Cited

U.S. PATENT DOCUMENTS

| | | | | |
|---|---|---|---|---|
| 7,727,798 | B1* | 6/2010 | Wang | C23C 14/0605 |
| | | | | 257/E21.041 |
| 8,323,752 | B2* | 12/2012 | Iwamura | C23C 14/0605 |
| | | | | 250/492.3 |
| 8,561,707 | B2* | 10/2013 | Jin | C23C 14/024 |
| | | | | 166/242.4 |
| 8,602,113 | B2* | 12/2013 | Jin | E21B 17/042 |
| | | | | 166/242.4 |
| 8,646,981 | B2* | 2/2014 | Peterson | 384/306 |
| 9,034,466 | B2* | 5/2015 | Zushi | C23C 14/0605 |
| | | | | 428/217 |
| 9,051,967 | B2* | 6/2015 | Inami | C23C 16/26 |
| 9,062,274 | B2* | 6/2015 | Mori | C10M 163/00 |
| 2002/0182448 | A1 | 12/2002 | van der Kolk et al. | |
| 2008/0038511 | A1 | 2/2008 | Eiji | |
| 2011/0021390 | A1 | 1/2011 | Mori et al. | |
| 2011/0162751 | A1* | 7/2011 | Fitzgerald | C23C 30/00 |
| | | | | 138/145 |
| 2014/0079910 | A1* | 3/2014 | Tsugawa | C10M 103/02 |
| | | | | 428/141 |
| 2014/0178637 | A1* | 6/2014 | Rajagopalan | C23C 28/044 |
| | | | | 428/141 |
| 2015/0036962 | A1* | 2/2015 | Ogahara | F16C 33/043 |
| | | | | 384/625 |
| 2015/0368578 | A1* | 12/2015 | Woydt | C10M 103/04 |
| | | | | 508/103 |

FOREIGN PATENT DOCUMENTS

| | | |
|---|---|---|
| JP | 2003-027214 A | 1/2003 |
| JP | 2007-023356 A | 2/2007 |
| JP | 2007-099949 A | 4/2007 |
| JP | 2011-026591 A | 2/2011 |
| JP | 2011-032429 A | 2/2011 |
| WO | 2005/083144 A1 | 9/2005 |

OTHER PUBLICATIONS

Sep. 29, 2016 Office Action issued in Chinese Patent Application No. 201510125093.5.

* cited by examiner

FIG.6
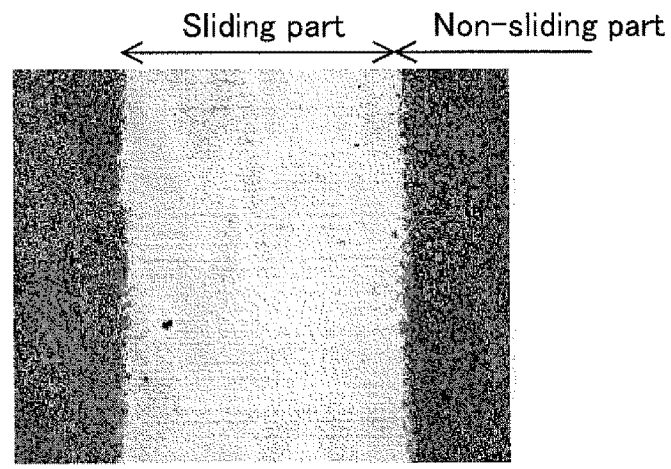
SAMPLE 2
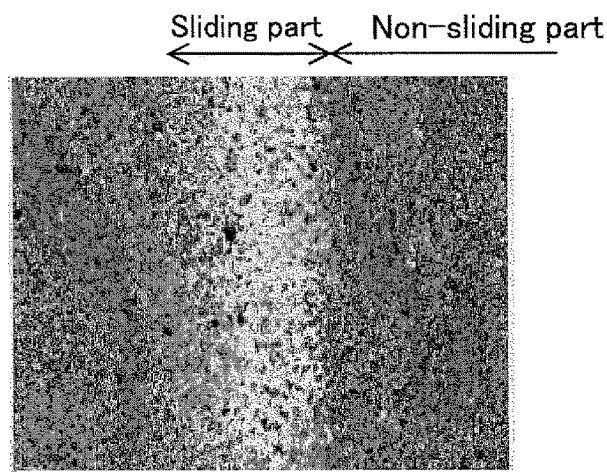
SAMPLE C4
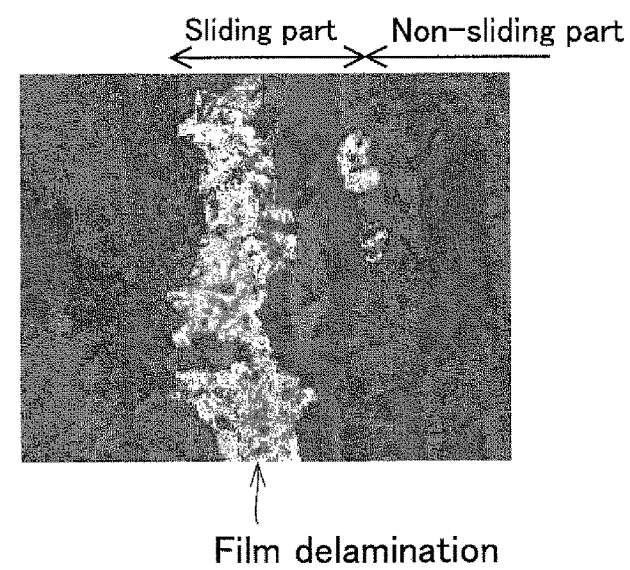
SAMPLE 5
Film delamination

SLIDING SURFACE AFTER FRICTION TEST (SAMPLE 1)

SLIDING SURFACE AFTER FRICTION TEST (SAMPLE 2)

SLIDING SURFACE AFTER FRICTION TEST (SAMPLE 3)

SLIDING SURFACE AFTER FRICTION TEST (SAMPLE 4)

SLIDING SURFACE AFTER FRICTION TEST (SAMPLE C4)

SLIDING MEMBER AND SLIDING MACHINE

TECHNICAL FIELD

The present invention relates to a sliding member having a sliding surface that is capable of both reducing the friction to a large extent and ensuring the wear resistance property. The present invention also relates to a sliding machine that comprises the sliding member.

BACKGROUND ART

Vehicles are equipped with driving mechanisms, such as internal-combustion engines, which comprise a number of sliding members (e.g., cams and camshafts, cylinders and pistons, and various shafts and bearings). In the machines comprising such sliding members (sliding machines), it is strongly demanded to reduce the friction coefficient between the sliding members to reduce the frictional loss or the like.

To this end, it has been proposed to form each sliding surface with an amorphous carbon film referred to as a diamond-like carbon film (which may be referred to as a "DLC film") capable of reducing the friction coefficient, for example. Relevant descriptions are found in Patent Literatures 1-4 below.

CITATION LIST

Patent Literature

[PTL 1]
JP2011-32429A
[PTL 2]
JP2011-26591A
[PTL 3]
JP2007-99949A
[PTL 4]
JP2007-23356A

SUMMARY OF INVENTION

Technical Problem

Patent Literatures 1-3 propose to use a low-friction sliding member in lubricant oil, wherein the low-friction sliding member has a sliding surface formed with an amorphous hard carbon film that contains boron (B) (which may be referred to as a "B-DLC film"). However, the B-DLC film proposed in these patent literatures is a hard coating in which the content of hydrogen (H) is small. In order to further reduce the friction coefficient of the sliding surface coated with the hard B-DLC film, the base material surface to be coated may have to be provided preliminarily as a mirror surface having a surface roughness (Ra) of less than 0.1.

Patent Literature 4 proposes to use a sliding member in lubricant oil, wherein the sliding member has a sliding surface coated with an amorphous hard carbon film that contains silicon (Si) (which may be referred to as a "Si-DLC film"). Patent Literature 4 also proposes to form a sliding surface by laminating a soft Si-DLC film on a hard Si-DLC film formed on the base material surface. However, the friction coefficient of such a sliding surface is still 0.07 or more ([0072] and FIG. 9 of Patent Literature 4), and it cannot necessarily be said that the friction coefficient is sufficiently reduced. It appears that this is because the developing mechanism of a reduced friction coefficient due to the Si-DLC film depends on an adsorbed water layer caused by silanol (Si—OH) that is generated on the surface ([0011], etc). It is to be noted that Patent Literature 4 does not describe in detail the surface roughness and the thickness of an underlying layer on which the Si-DLC film is formed.

The present invention has been created in view of such circumstances, and an object of the present invention is to provide a sliding member having a sliding surface that is capable of both reducing the friction coefficient to a large extent and ensuring sufficient wear resistance property. Another object of the present invention is to provide a sliding machine that comprises the sliding member.

Solution to Problem

As a result of intensive studies to solve the above problems and repeating trial and error, the present inventors have newly found that a considerably low friction coefficient can be obtained under a wet condition where lubricant oil exists, by providing the sliding surface with a B-DLC film that comprises a novel composition different from conventional ones. It has also been found that the wear resistance property of the sliding surface can be ensured by forming the B-DLC film on a hard underlying layer. Developing these achievements, the present invention has been accomplished as will be described hereinafter.

<<Sliding Member>>

(1) According to an aspect of the present invention, there is provided a sliding member comprising: a base material; and a sliding film that covers a surface of the base material and constitutes a sliding surface. The sliding member is used under a wet condition where lubricant oil exists. The sliding member is characterized in that: the sliding film comprises a laminated film; the laminated film comprises: an underlying layer formed on the surface of the base material; and an outermost layer formed at least on a part of the underlying layer; the outermost layer comprises specific boron-containing amorphous carbon (referred hereinafter to as a "specific B-DLC"); and the specific B-DLC contains 4-50 at % (referred simply to as "%") boron (B) and 5-50% hydrogen (H) when the outermost layer as a whole is 100%.

(2) The sliding member of the present invention has the sliding surface constituted of the laminated film of which the outermost layer exists at least on a part of the underlying layer provided on the base material surface, and the outermost layer comprises the specific B-DLC which contains a relatively large amount of B and H. This sliding surface develops an excellent low friction property under a wet condition where lubricant oil exists. In a sliding machine comprising the sliding member of the present invention, therefore, the driving force necessary for operation, the frictional loss and the like can be reduced to a large extent, so that the performance of the sliding machine can be enhanced and the saving of energy is possible.

(3) The reason that the sliding surface according to the present invention, in particular, the outermost layer can bring out considerably low friction property is not necessarily sure, but it appears to be as follows in the present circumstances. Since the specific B-DLC according to the present invention has a large content of B and H (in particular, the amount of H is large), the amount of C (in particular, the amount of C of $sp^2$ hybridized orbital) is relatively small, and the specific B-DLC is more likely to wear away than the conventional B-DLC. Accordingly, the specific B-DLC formed initially on the underlying layer wears away over time immediately after starting the sliding, so that the sliding surface is smoothed to significantly reduce the surface roughness. This allows the fluid lubrication to stably occur owing to the lubricant oil on the sliding surface according to the present invention. Therefore, the solid contact due to mixture lubrication, boundary lubrication and the like are unlikely to occur. In addition to this, the specific B-DLC itself has excellent slidability, and it appears that the sliding surface according to the present invention exhibits considerably low friction property under a wet condition.

The smoothing of the sliding surface according to the present invention appears to occur owing to the specific B-DLC (film) wearing away while being in cooperation with the underlying layer. For example, even if the surface roughness of the underlying layer is 0.1 or more (or more than 0.1) in an embodiment, or 0.15 or more in another embodiment, or 0.2 or more in a further embodiment, as the arithmetic average roughness (Ra/JIS B0601: '01), it appears that a super-smooth sliding surface is formed to have a surface roughness of 0.05 or less in an embodiment, or 0.04 or less in another embodiment, as the Ra because there can be obtained a state in which the fine recesses on the surface of the underlying layer are filled with the specific B-DLC. Note that the smooth outermost surface may be formed only of the outermost layer (specific B-DLC film), or may also be formed such that the outermost layer and the underlying layer are merged into each other.

Thus, the sliding surface according to the present invention is smoothed during the course of sliding, and the surface roughness of the outermost layer before the sliding may therefore be large to some extent. This respect applies to the underlying layer or the base material surface. As will be understood, however, it is preferred that each surface roughness of them is small even before the sliding in view of suppressing the wear of the sliding film. For example, it is preferred that the surface roughness of the underlying layer before the sliding (when the film is formed) is 0.3 or less in an embodiment, or 0.1 or less in another embodiment, as the Ra.

(4) In order that the laminated film according to the present invention continues to stably exhibit the above-described low friction coefficient, it is also important to ensure the wear resistance property. For example, a wear resistant layer may be provided as the underlying layer to have higher hardness or elastic modulus than those of the outermost layer or the specific B-DLC thereby to achieve both of the low friction property and the high wear resistance property of the sliding surface at a higher level. Such an underlying layer may be a hard layer, such as carburized layer and nitrided layer, which is formed directly on the base material surface, but the wear resistance property can be further enhanced by using a hard film that covers the base material surface. Such a hard film may be formed of nitride (such as CrN and TiN), carbide (such as CrC), hard amorphous carbon, or other appropriate material.

Particular examples of the hard amorphous carbon include: boron-containing amorphous carbon that has a different composition than that of the specific B-DLC so as to be hard (hard B-DLC); silicon-containing amorphous carbon that contains silicon (Si) (Si-DLC); and various types of amorphous carbon in which the content of H is zero or small (H-free DLC). It is preferred that the underlying layer formed of such hard amorphous carbon has a surface hardness of 20 GPa or more in an embodiment, or 23 GPa or more in another embodiment, or 25 GPa or more in a further embodiment.

It is to be noted that the underlying layer may be exposed partially at the outermost surface due to the wear of the outermost layer (see FIG. 1A to FIG. 1C). It is therefore preferred that the underlying layer is not only merely excellent in the wear resistance property but also has a low friction coefficient to be excellent in the slidability. As will be understood, the underlying layer according to the present invention may be provided as a single layer, or otherwise may comprise two or more layers.

(5) The sliding surface according to the present invention is smoothed such that the specific B-DLC film as the outermost layer wears away in accordance with the shape (primarily with the outer diameter) of a counterpart material (FIG. 1A). To obtain stably high slidability (low friction and high wear resistance property), therefore, it is preferred that the outermost layer (specific B-DLC film) has a sufficiently large thickness at least before starting the sliding. Note, however, that forming an unduly large thickness is not realistic and may be undesirable because the clearance between the sliding surfaces will excessively increase as the wear progresses.

According to the research investigation by the inventors, it has been found that, in order to stably maintain the high slidability, a layer thickness ratio (T1/R2) is 3-200 in an embodiment, or 4-100 in another embodiment, or 5-50 in a further embodiment. Here, the layer thickness ratio (T1/R2) is defined as a ratio of a layer thickness (initial layer thickness) (T1) of the outermost layer to a surface roughness (R2) based on an arithmetic average roughness (Ra) of the underlying layer on which the outermost layer is formed. In this case, even when the wear progresses at a site where the outermost layer wears away the most (a part surrounded by the dashed line in FIG. 1A), the underlying layer partially supports the counterpart material, so that the progression of the wear stops in a state where the outermost layer fills up recesses on the underlying layer. As a result, the low friction is maintained owing to the smooth outermost surface (sliding surface) (FIG. 1B). If, in contrast, the initial outermost layer has a small thickness relative to the surface roughness of the underlying layer (if the layer thickness ratio is unduly small), irregularities due to the surface roughness of the underlying layer appear at the outermost surface of the sliding surface, and the outermost surface (sliding surface) cannot be smoothed so that the friction coefficient between the sliding surfaces may not be reduced (FIG. 1C).

The layer thickness ratio as referred in the present description is specified based on the layer thickness (T1; initial thickness) of the outermost layer before the sliding (before the start of operation of the sliding machine). However, even after starting the operation of the sliding machine, if there is a region almost all of which is not slidably in contact with the counterpart material (a region in which the wear does not progress), the layer thickness (T1) of the outermost layer of the region can be used to calculate the layer thickness ratio. Measurement of the layer thickness (not only that of the outermost layer but that of the underlying layer) may be performed based on a SEM image after observing the cross-section of the sliding surface using a scanning electron microscope (SEM) and determining the boundaries of each layer. If it is difficult to determine the boundary between the underlying layer and the outermost layer which have the same nature, the boundary can be determined by using elemental analysis or the like for the cross-section of the sliding surface, for example. When the surface roughness of the underlying layer affects the layer thickness of the outermost layer, a center line obtained from the arithmetic average roughness (Ra) is used as the boundary (reference position for measurement of the layer thickness), and the thickness from the center line to the outermost surface may be determined as the layer thickness. The layer thickness defined in such a manner is measured at each of ten points selected at random, and the measured values are arithmetically averaged to be used as the layer thickness of the outermost layer.

<<Sliding Machine>>

The present invention can be perceived not only as the sliding member but as a sliding machine that uses the sliding member. That is, according to another aspect of the present invention, there is provided a sliding machine comprising: a pair of sliding members having sliding surfaces that face each other and can relatively move; and lubricant oil that can be interposed between the sliding surfaces facing each other. The sliding machine is characterized in that at least one of the sliding members comprises the above-described sliding member of the present invention.

<<Others>>

(1) The specific B-DLC according to the present invention may contain C, H, B and other elements (modifying elements) that are effective for enhancing the properties. As will be understood, the specific B-DLC may also contain "unavoidable impurities" that are difficult to be removed for the cost or technical reason.

The "layer" as referred to in the present invention may be a "film" in other word, but is not necessarily in a film-like form in which the layer is continuously present. For example, the outermost layer may be in a film-like form in which the outermost layer is continuously present so as to completely cover the underlying layer before the sliding, and/or in a state in which the outermost layer is intermittently present after starting the sliding. That is, the underlying layer may be in a state of appearing (being exposed) partially at the outermost surface (sliding surface). Thus, the sliding surface according to the present invention may be configured only of the outermost layer, or may also be configured such that the outermost layer and the underlying layer are present in a mixture.

(2) The sliding surface according to the present invention is not limited in its specific smoothness (such as surface roughness), friction coefficient, wear resistance property and other properties. This is because such properties vary depending on the sliding conditions (such as a load acting between the sliding surfaces, the material quality and shape of the counterpart material, and the type of lubricant oil). Suffice it to say that one example of the friction coefficient (under a wet condition) of the sliding surface according to the present invention may be 0.01-0.05, for example.

(3) Lubricant oil used when operating the sliding machine of the present invention is not limited in its type and composition, but may ordinarily contain base oil and various other additives. For example, the lubricant oil can contain 500 ppm or more as a total of one or more of molybdenum (Mo), sulfur (S), phosphorus (P), zinc (Zn), calcium (Ca), magnesium (Mg), sodium (Na), barium (Ba), copper (Cu) and the like, when the whole of the lubricant oil is 100 mass %.

In view of reducing the environmental burden, however, it is preferred that the content of Mo is not more than 100 ppm. More specifically, it is preferred to use lubricant oil that is substantially free from molybdenum dialkyldithiocarbamate (MoDTC) which has been conventionally used as a friction adjuster or the like (such lubricant oil may be referred to as "MoDTC-free oil").

It is said in general that, when the MoDTC-free oil is used, the friction coefficient between the sliding surfaces will increase. According to the present invention, however, the friction coefficient between the sliding surfaces can be considerably reduced regardless of whether the lubricant oil is MoDTC-containing oil or MoDTC-free oil. The reason that such a friction reduction effect can be obtained is not necessarily sure, but it appears that the specific B-DLC also contributes to forming a special boundary film of high slidability between the sliding surfaces, in addition to the above-described surface smoothing.

(4) Unless otherwise stated, a numerical range "x to y" as referred to herein includes the lower limit value x and the upper limit value y. Various numerical values or any numerical value included in numerical ranges described herein may be freely selected or extracted as a new lower limit value or upper limit value, and any numerical range such as "a to b" may thereby be newly provided using such a new lower limit value or upper limit value.

BRIEF DESCRIPTION OF DRAWINGS

FIG. 6 is a set of microscope photographs obtained by observing the sliding surface of each sample.

DESCRIPTION OF EMBODIMENTS

Figure 1A:
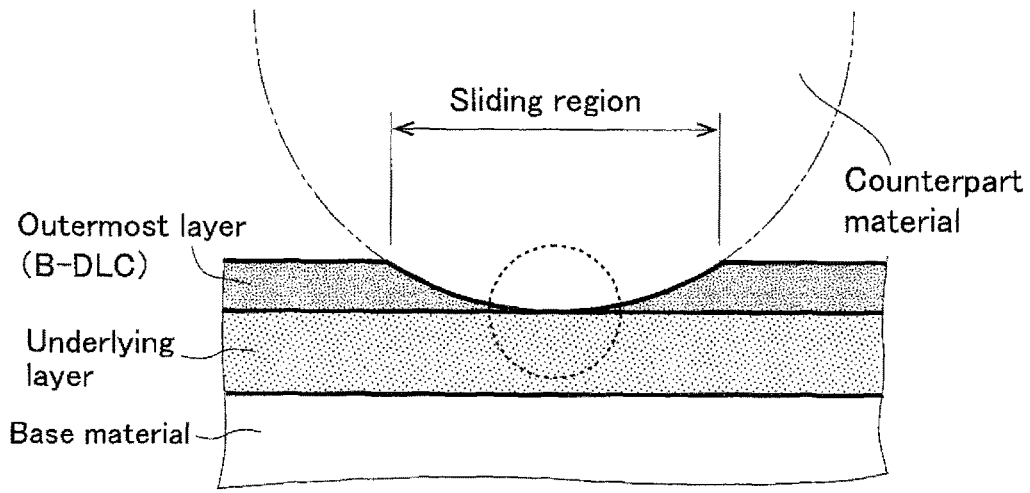
FIG. 1A is an explanatory view illustrating the vicinity of a sliding surface (laminated film).
Figure 1B:
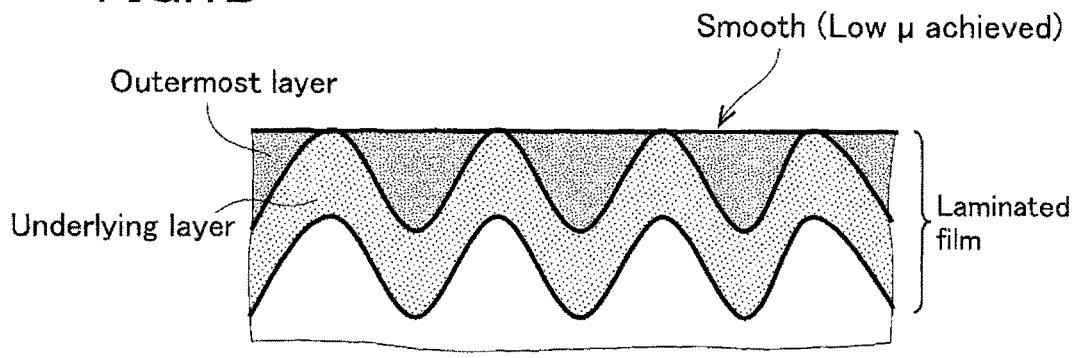
FIG. 1B is an explanatory view illustrating a case in which the layer thickness of an outermost layer is sufficient for the surface roughness of an underlying layer.
Figure 1C:
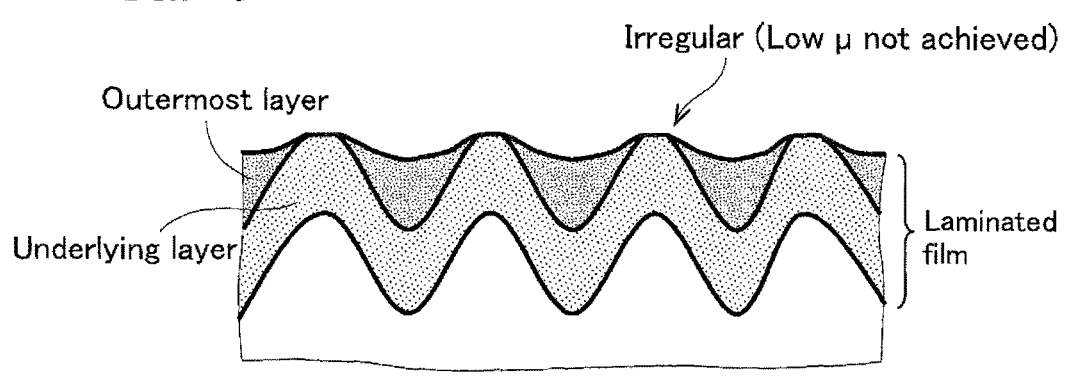
FIG. 1C is an explanatory view illustrating a case in which the layer thickness of an outermost layer is insufficient for the surface roughness of an underlying layer.

The present invention will be described in more detail with reference to embodiments of the present invention. One or more features freely selected from the description herein may be added to the above-described features of the present invention. The contents described herein can be applied not only to the sliding member and the sliding machine of the present invention but to a method of manufacturing them. Features regarding the manufacturing method, when understood as a product-by-process, may also be features regarding a product. Which embodiment is the best or not may be different in accordance with objectives, required performance and other factors.

<<Outermost Layer>>

(1) The outermost layer according to the present invention comprises a specific B-DLC (film). It is preferred that the specific B-DLC contains 4-50% B in an embodiment, or 23-50% B in another embodiment, or 24-40% B in still another embodiment, or 25-35% B in yet another embodiment, or 27-33% B in a further embodiment. It is also preferred that the specific B-DLC contains 5-50% H in an embodiment, or 26-50% H in another embodiment, or 27-40% H in still another embodiment, or 28-35% H in a further embodiment. B and H affect the hardness and therefore the wear property of the specific B-DLC. An unduly small amount thereof excessively increases the hardness of B-DLC, while an unduly large amount excessively reduces the hardness of B-DLC. In both cases, smoothing of the outermost layer will be hindered.

If the content of O is unduly large, the specific B-DLC will be excessively softened, so that successful film forming may be difficult. It is therefore preferred that the content of O is less than 6% in an embodiment, or less than 3% in another embodiment. The specific B-DLC may contain Al, Mn, Mo, Si, Ti, Cr, W, V, Ni and the like. The content of these elements is not limited, but the total content thereof may preferably be less than 8 at % in an embodiment, or less than 4 at % in another embodiment. The composition of the specific B-DLC may be uniform or may vary with respect to the thickness direction of the outermost layer, or may have some gradient.

(2) The sliding surface according to the present invention wears away over time to be smoothed due to the specific B-DLC film sliding with a counterpart material. Therefore, the surface roughness before starting the sliding (initial surface roughness) is not particularly limited. Thus, the initial surface roughness of the sliding surface may be 0.1 micrometers or more in an embodiment, or 0.15 micrometers or more in another embodiment, or 0.2 micrometers or more in a further embodiment. However, it is preferred as the initial surface roughness is reduced. For example, the surface roughness may preferably be 0.4 micrometers or less in an embodiment, or 0.3 micrometers or less in another embodiment, as the Ra.

The specific B-DLC, which develops self smoothing ability, may preferably have a surface hardness of 25 GPa or less in an embodiment, or 20 GPa or less in another embodiment, for example. Note that the surface hardness of a heat-treated steel base material is about 8 GPa.

In view of ensuring the toughness as well as the self smoothing ability, the elastic modulus of the specific B-DLC may preferably be 200 GPa or less in an embodiment, or 170 GPa or less in another embodiment, or 150 GPa or less in a further embodiment, for example. However, unduly low elastic modulus will reduce the hardness. Therefore, the elastic modulus may preferably be 100 GPa or more in an embodiment, or 120 GPa or more in another embodiment.

<<Underlying Layer>>

In the present invention, the type of the underlying layer is not limited, but the underlying layer may preferably have excellent wear resistance property and slidability (low friction property) because the underlying layer may be exposed at the sliding surface. Since the low friction of the sliding surface is achieved by smoothing the outermost surface, the surface roughness of the underlying layer in the present invention is not limited. However, the surface roughness may preferably be 0.6 micrometers or less in an embodiment, or 0.2 micrometers or less in another embodiment, or 0.1 micrometers or less in a further embodiment, as the Ra. The layer thickness of the underlying layer is also not limited. If the thickness is about 1-5 micrometers, for example, the effect of the surface roughness of the base material on which the underlying layer is formed can be absorbed, and stable low frictional sliding can be ensured.

<<Base Material>>

The base material above which the sliding surface is formed is not limited in its material, but may ordinarily comprise a metal material, in particular a steel (carbon steel or alloy steel) material. The base material surface may be subjected to appropriate surface treatment, such as nitriding and carburizing. The surface roughness may preferably be, but is not limited to, 0.3 micrometers or less in an embodiment, or 0.1 micrometers or less in another embodiment, as the Ra. In order to enhance the interfacial adhesion with the underlying layer, one or more intermediate layers such as formed of Cr and CrC may be formed on the base material surface.

<<Generation of Each Layer>>

Method of generating the outermost layer and the underlying layer is not limited, but the specific B-DLC to be the outermost layer and Si-DLC, B-DLC, TiN or the like to be the underlying layer can be efficiently formed using plasma CVD method, ion plating method, sputtering method (in particular unbalanced magnetron sputtering method) or other appropriate method, for example.

When the specific B-DLC (film) is formed using direct-current plasma CVD method, for example, reactive gases and carrier gas are introduced into a vacuum chamber in which the base material formed thereon with the underlying layer is placed. In this state, plasma is generated by discharging so that the plasma-ionized C, CH, B and the like in the reactive gases adhere to the surface to be treated (base material surface or underlying layer surface) thereby to form the specific B-DLC. In this operation, by employing (i) a lowered treatment temperature and (ii) plasma control, there can be readily formed the specific B-DLC film in which the hydrogen amount is large and which can easily be smoothed by wear.

Specifically, the lowered treatment temperature reduces the plasma density thereby to provide a highly hydrogen-containing specific B-DLC in which a large amount of hydrogen in the raw material gases is incorporated. In addition, by controlling the plasma into a state in which the negative glow discharges overlap one another, hydrocarbon used as a reactive gas is likely to decompose, so that the specific B-DLC is readily formed to have a large amount of H and an appropriate ratio of C ($Csp^2$) of $sp^2$ hybridized orbital.

Examples of the reactive gases to be used include: hydrocarbon gases, such as methane ($CH_4$), acetylene ($C_2H_2$) and benzene ($C_6H_6$); and TEB (triethyl boron), TMB (trimethyl boron), $B_2H_6$ (diborane) and other boron compounds which are to be B sources. The carrier gas may be argon gas, but using hydrogen gas mitigates the ion bombardment to the surface of B-DLC which is being generated, so that the specific B-DLC is readily formed to have a large amount of H and an appropriate ratio of $Csp^2$.

Si-DLC to be the underlying layer can also be formed using the direct-current plasma CVD method in a similar manner to that for the specific B-DLC by substituting the gas as the B source with TMS (tetramethyl silane) as the Si source or other appropriate gas and adjusting the treatment condition. In addition, TiN to be the underlying layer can also be formed using the direct-current plasma CVD method in a similar manner to that for the specific B-DLC by substituting the gas as the B source with TiCl$_4$ (titanium tetrachloride) as the Ti source or other appropriate gas and adjusting the treatment condition.

<<Intended Use>>

Specific form and intended use of the sliding member of the present invention are not limited, and the sliding member of the present invention can be used for a wide variety of sliding machines. Examples of such sliding members include: a shaft and a bearing; a piston and a liner; gears that are geared with each other; a cam and a valve lifter or a follower that constitute a dynamic valve system; a valve and a valve guide; and a rotor and a rotor housing. Examples of sliding machines include a driving unit, such as an engine and a transmission, which is mounted on a car or other vehicle.

EXAMPLES

Manufacturing of Samples

Various samples (sliding members) listed in Table 1A and Table 1B were manufactured (both tables may be collectively referred to as "Table 1" in simple). Each sample was configured such that each of various coatings was formed on one surface to be a sliding surface of a block test piece as the base material (15.7 mm×6.5 mm×10 mm). Note, however, that the sliding surface of Sample C1 was the polished surface of the base material without any film.

<Base Material>

A quenched and tempered material (HV 700±50) of carburized steel (JIS SCM420) was used as the base material of Sample C1. Quenched and tempered materials (HRC 58) of martensite-based stainless steel (JIS SUS440C) were used as the base materials of other samples than Sample C1. A surface (surface to be treated) of each base material was polished to the surface roughness (Ra) as listed in Table 1 before film forming. Unless otherwise stated, surface roughness values as referred to in the present example are all based on the arithmetic average roughness (Ra) in accordance with JIS B0601: '01.

<Film Forming>

Figure 2:
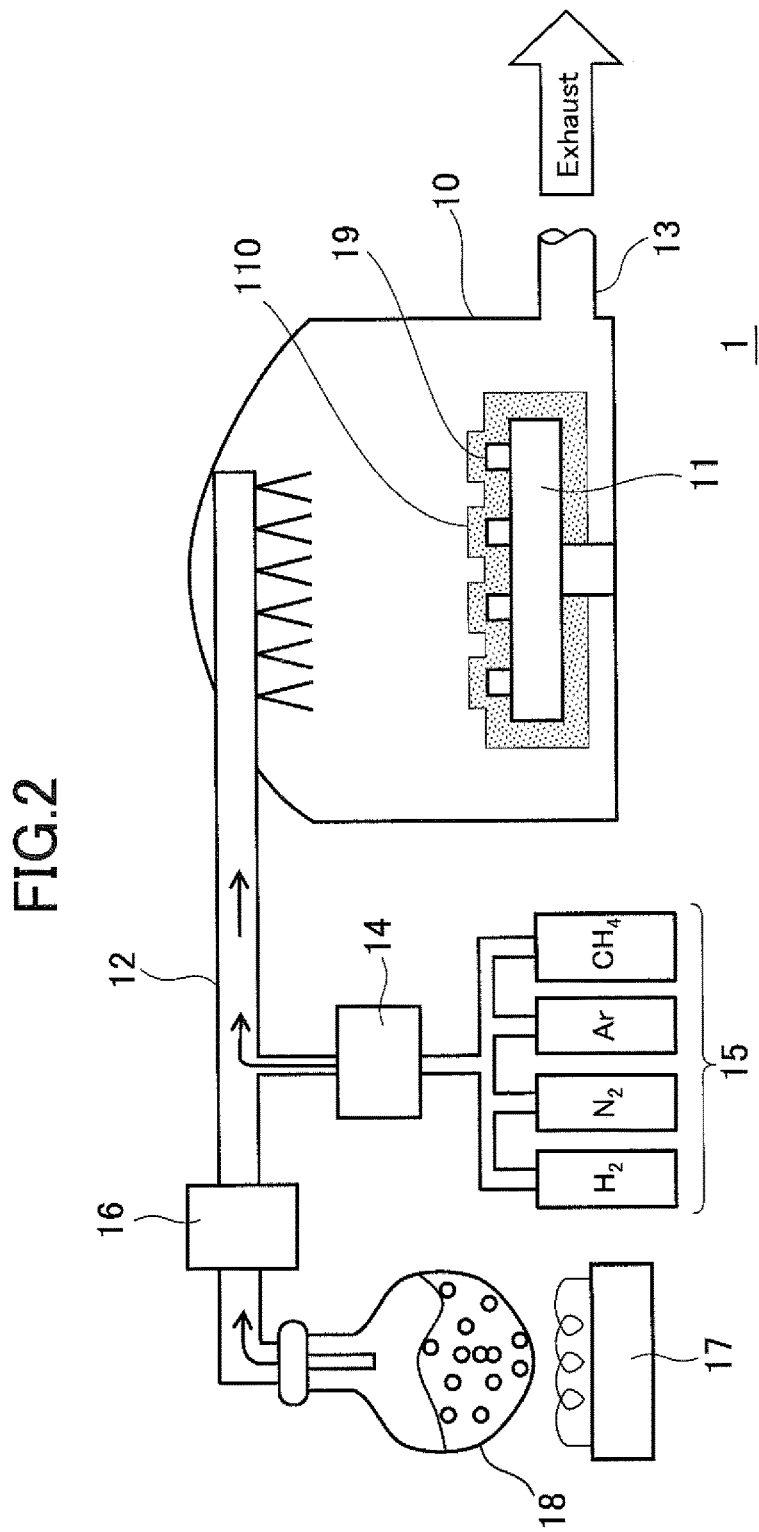
FIG. 2 is a schematic view illustrating a film forming apparatus.

(1) Each of Samples 1-4 and Samples C8-C11 was configured such that a Si-DLC film (underlying layer) and a B-DLC film (outermost layer) were formed in this order on the base material surface to form a laminated film. Film forming of these films was performed by a direct-current plasma CVD (PCVD) method using a film forming apparatus 1 as shown in FIG. 2 under the film forming conditions listed in Table 1A. Specific method is as follows.

Film forming apparatus 1 comprises: a stainless chamber 10; a base table 11 having conductivity; a gas introduction pipe 12; and a gas exhaust pipe 13. Various gas cylinders 15 are connected to the gas introduction pipe 12 via valves (not shown) and a mass flow controller (mass flow) 14.

Raw material storage containers 18, which can be heated by heaters 17, are also connected to the gas introduction pipe 12 via valves (not shown) and a mass flow controller (mass flow) 16. A rotary pump (not shown) and a diffusion pump (not shown) are connected to the gas exhaust pipe 13 via valves (not shown).

Film forming using the film forming apparatus 1 was performed in a procedure as below. Base materials 19 are placed on the base table 11 in the chamber 10 of the film forming apparatus 1. The chamber 10 is then sealed and evacuated to vacuum using the rotary and diffusion pumps connected to the gas exhaust pipe 13. Gasses adjusted to a desired composition as listed in Table 1A are introduced from the gas introduction pipe 12 to the chamber 10 evacuated to vacuum. A voltage is applied in the chamber 10 from a plasma power source. In this way, a glow discharge environment 110 is formed around the base materials 19.

Film forming procedure is specifically as follows. Discharge heating, ion nitriding and pre-sputtering were performed first in this order (pre-treatment step). Treatment conditions at that time (type of used gas, introduction amount of gas, chamber inner pressure, base material temperature, and applied voltage) are listed in Table 2. The same treatment was performed for all the samples.

Subsequent to the pre-treatment step, a synthetic treatment step for forming a Si-DLC film was performed, which was followed by a synthetic treatment step for forming a B-DLC film. Treatment conditions therein are listed in Table 1A.

TMS (tetramethyl silane) as the raw material gas for the Si-DLC film and TEB (triethyl boron) as the raw material gas for the B-DLC film were put into respective raw material storage containers 18 provided separately, and were heated by the heaters 17 and supplied after being vaporized. The composition (the content of Si or B and H) was controlled by adjusting the ratio (flow ratio) of TMS or TEB and CH$_4$ and the synthetic temperature as listed in Table 1.

(2) Each of Samples C2 and C3 is configured such that only a Si-DLC film is formed on the base material surface, and Sample C7 is configured such that only a B-DLC film is formed on the base material surface. These single films were formed in line with the treatment conditions as listed in Table 1 in similar manners to those for the above-described laminated films.

(3) Each of Samples C4 and C5 is configured such that a B-DLC film is formed by sputtering on the surface to be treated of the base material using an unbalanced magnetron sputtering apparatus (available from Kobe Steel, Ltd). Specifically, after a Cr-based intermediate layer was formed on a surface of the base material, the B-DLC film was formed thereon by sputtering B$_4$C and graphite targets using Ar gas while introducing CH$_4$ gas (hydrocarbon-based gas).

(4) Sample C6 is configured such that a molybdenum disulfide-based coating (MK-4190 available from TOYO DRILUBE CO., LTD.) is formed on the base material surface.

(5) Each of Samples 5 and 6 is configured such that the Si-DLC film in Samples 1-4 is changed to a TiN film (nitride film) and a B-DLC film (outermost layer) is formed on the underlying layer. Film forming of these laminated films was performed under the conditions listed in Table 1B, basically as with Samples 1-4. Note, however, that TiCl$_4$ (titanium tetrachloride) was used as the raw material when forming the TiN film (underlying layer) after the previously-described pre-treatment step. Like TMS used for Samples 1-4, TiCl$_4$ (titanium tetrachloride) was put into the raw material storage container 18, heated by the heater 17, and supplied after being vaporized. Film forming of the TiN film was performed while adjusting the ratio (flow ratio) of TiCl$_4$ and N$_2$ or the like and the synthetic temperature as listed in Table 1B.

<<Measurement/Observation>>

For each sample listed in Table 1, respective properties were measured. Results thereof are collectively listed in Table 1. Specifically, the surface roughness (Ra) was measured using a white light interferometric non-contact surface profiler (New View 5022 available from Zygo Corporation). The film thickness (layer thickness) was measured using an accurate film thickness measuring apparatus (CALOTEST available from CSEM Instruments SA). The B amount and the Si amount in each coated film were measured by EPMA analysis (JXA-8200 available from JEOL Ltd.), and the H amount was measured by RB S/HFS analysis (Pelletron 3SDH available from National Electrostatics Corporation).

<<Friction Test>>

Figure 3:
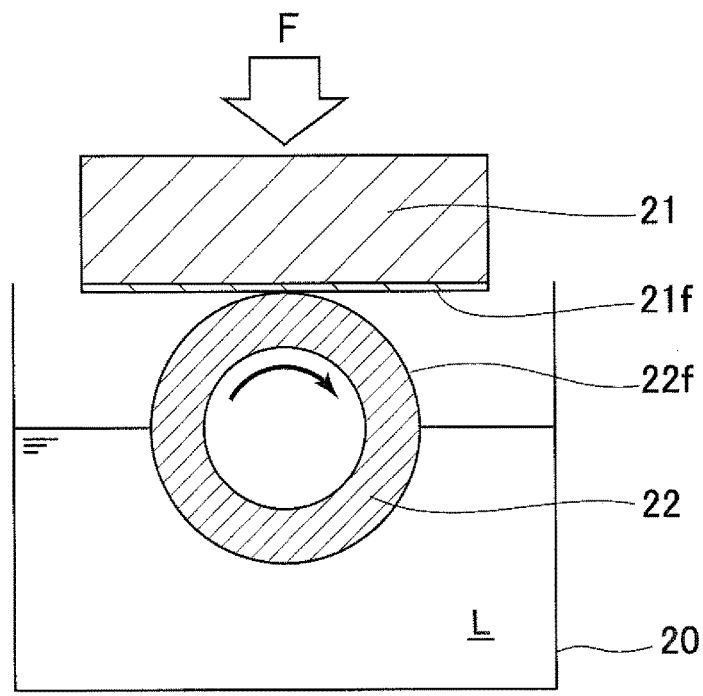
FIG. 3 is an explanatory view illustrating an aspect of a ring-on-block friction test.

The above-described coated surface of each sample was used as the sliding surface (except for Sample C1) to perform a friction test using a ring-on-block friction tester (LFW-1 available from FALEX CORPORATION). FIG. 3 illustrates an overview of the aspect of the friction test. Specifically, the sliding surface 21f (15.7 mm×6.5 mm) of the block test piece 21 according to each sample was contacted slidably with a sliding surface 22f of a ring test piece 22 rotating in a bath 20 filled with lubricant oil L, while being pressed against the sliding surface 22f, and the friction coefficient at that time and the wear depth after the test were measured. A carburized material (SAE4620, (phi) 35 mm×8.8 mm, surface roughness Ra of 0.2±0.1 micrometers) was used as the ring test piece 22. The used lubricant oil was genuine engine oil available from TOYOTA MOTOR CORPORATION (Toyota Castle SN 0W-20/IL-SAC standard: GF-5, MoDTC-free). Test conditions were as follows: load F for pressing the block test piece 21 against the ring test piece 22 was 133 N; sliding speed between both test pieces was 0.3 m/s; oil temperature of the lubricant oil was 80 degrees C. (fixed); and test time was 30 minutes. The friction coefficient was an average value during one minute immediately before the end of the test. The friction depth was calculated, from the shape obtained using the white light interferometric non-contact surface profiler, as a depth from the non-sliding surface to the deepest part of the sliding surface. Results thus obtained are collectively listed in Table 1.

<<Evaluation>>

(1) Friction Coefficient

Figure 4:
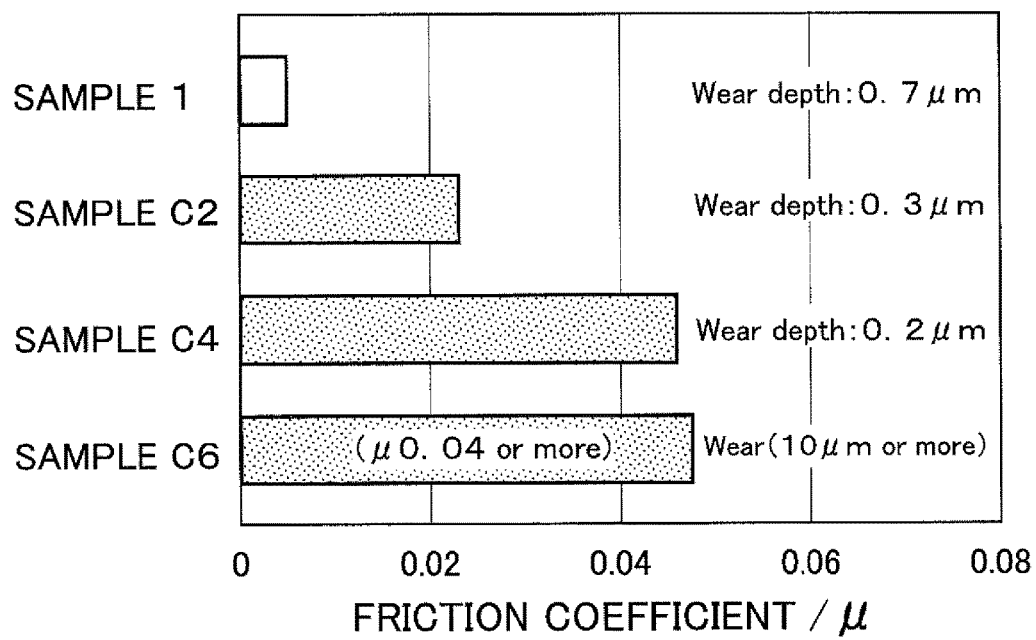
FIG. 4 is a bar graph illustrating the friction coefficient of each sample with the wear depth.

FIG. 4 illustrates the friction coefficients according to the samples of Table 1A in comparison. As apparent from FIG. 4 and Table 1A, Samples 1-4 and Sample C7 each having the specific B-DLC at the sliding surface (outermost layer) developed significantly smaller friction coefficients than those of other samples. For example, it has been revealed that Sample 1 has a friction coefficient of not more than 0.01 and develops a super-low friction property.

It has been found that, in Sample 1, the wear depth of the outermost layer is 0.7 micrometers to the initial thickness before the friction test of 0.7 micrometers, and almost all of the B-DLC film of the outermost layer is in a worn state at a part of the sliding surface. It has also been found, however, that the wear of Sample 1 does not progress beyond the initial thickness of the outermost layer, and the wear resistance property is thus ensured owing to the underlying layer. Therefore, it appears that, in Sample 1, the B-DLC film constituting the outermost layer wears away during the sliding to form a smooth sliding surface while the Si-DLC film constituting the underlying layer ensures the wear resistance property, so that both layers act synergistically to stably exhibit a considerably low friction property.

As found from the comparison of the layer thickness and the wear depth of Samples 2-4 listed in Table 1A, the wear depth is smaller than the layer thickness when the layer thickness of the B-DLC film constituting the outermost layer is sufficient. It appears that this is because, if the sliding surface is sufficiently smoothed due to the wear of the B-DLC film to have a considerably reduced friction coefficient, then the sliding surface does not wear away any more.

(2) Effect of Initial Surface Roughness

Figure 5A:
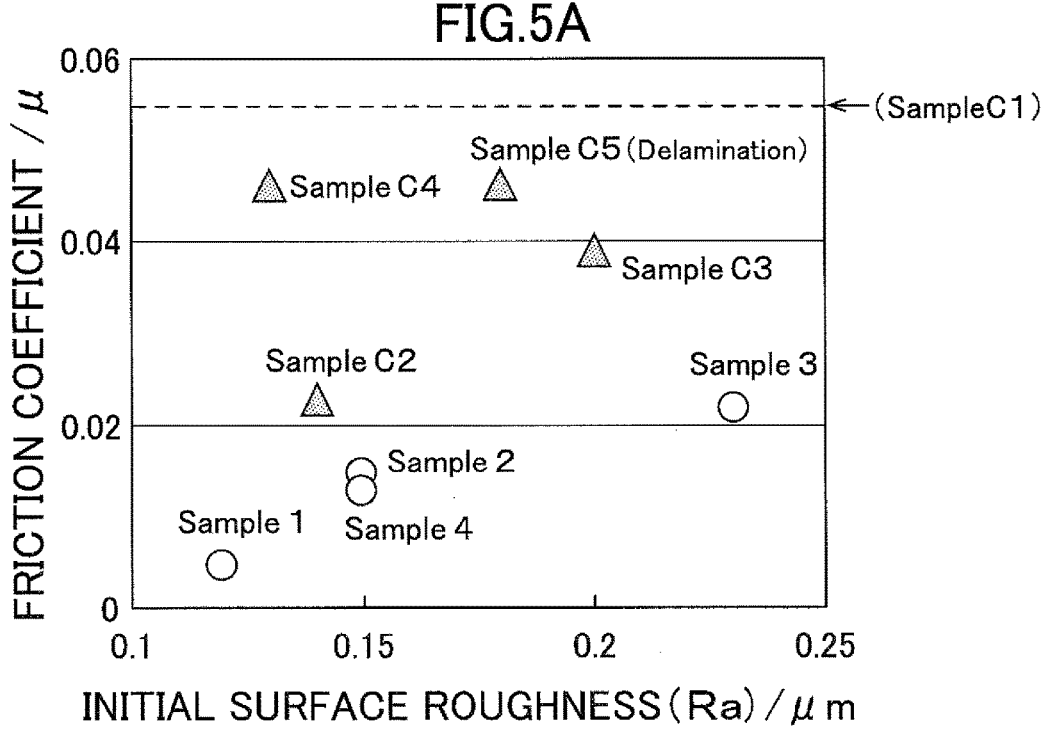
FIG. 5A is a dispersion diagram illustrating a relationship between the initial surface roughness and the friction coefficient at sliding surfaces.
Figure 5B:
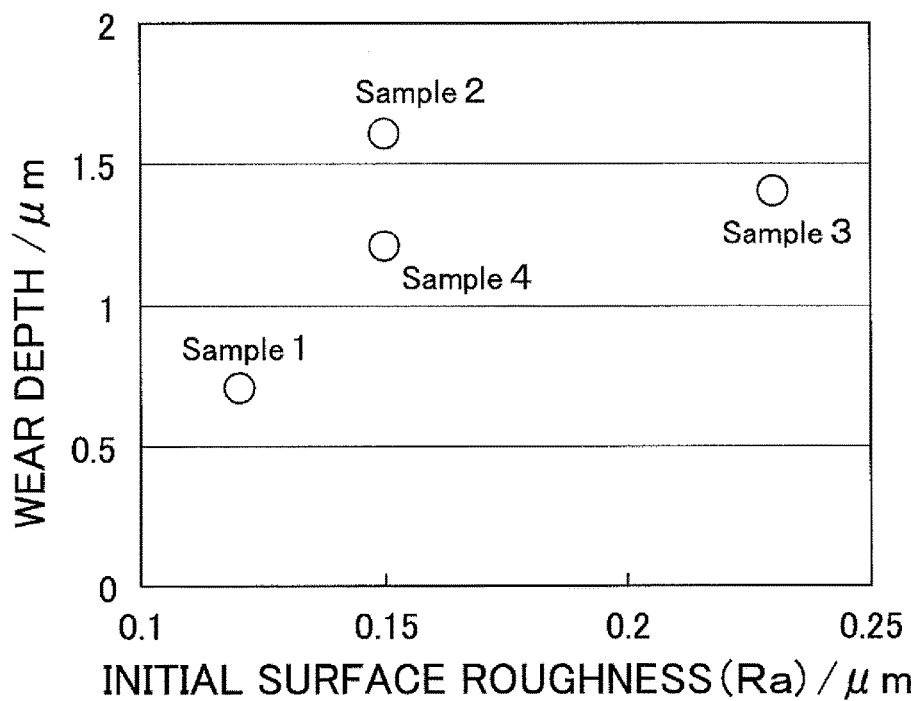
FIG. 5B is a dispersion diagram illustrating a relationship between the initial surface roughness and the wear depth at sliding surfaces.
Figure 7:
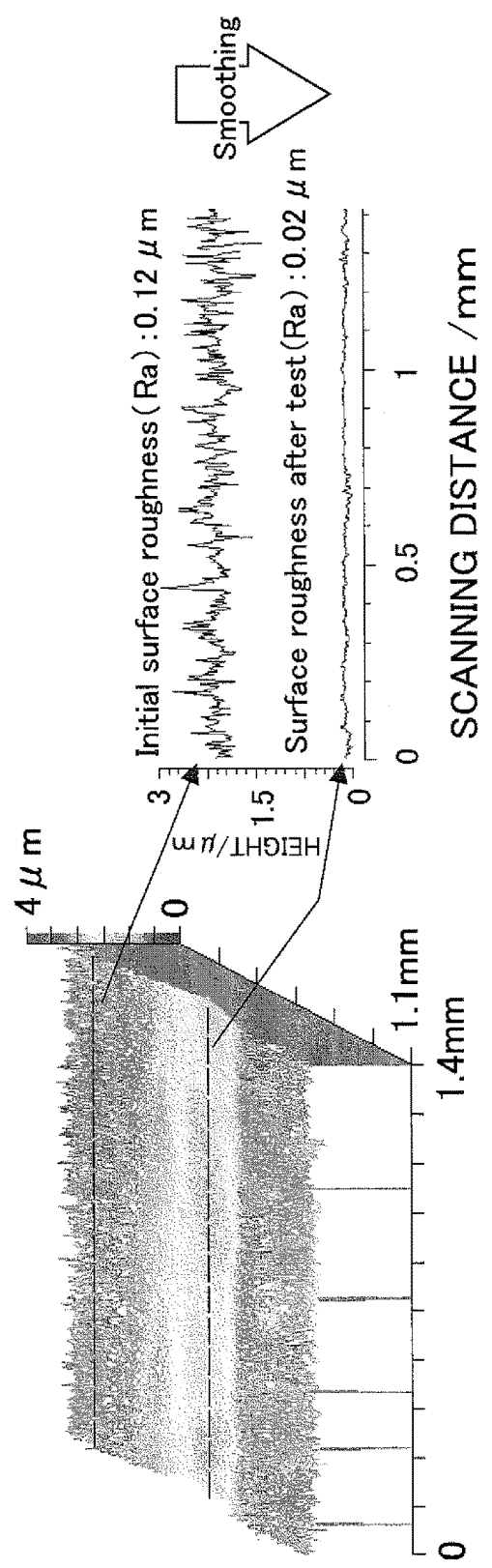
FIG. 7 is a diagram illustrating the sliding surface of Sample 1 after friction test.
Figure 8:
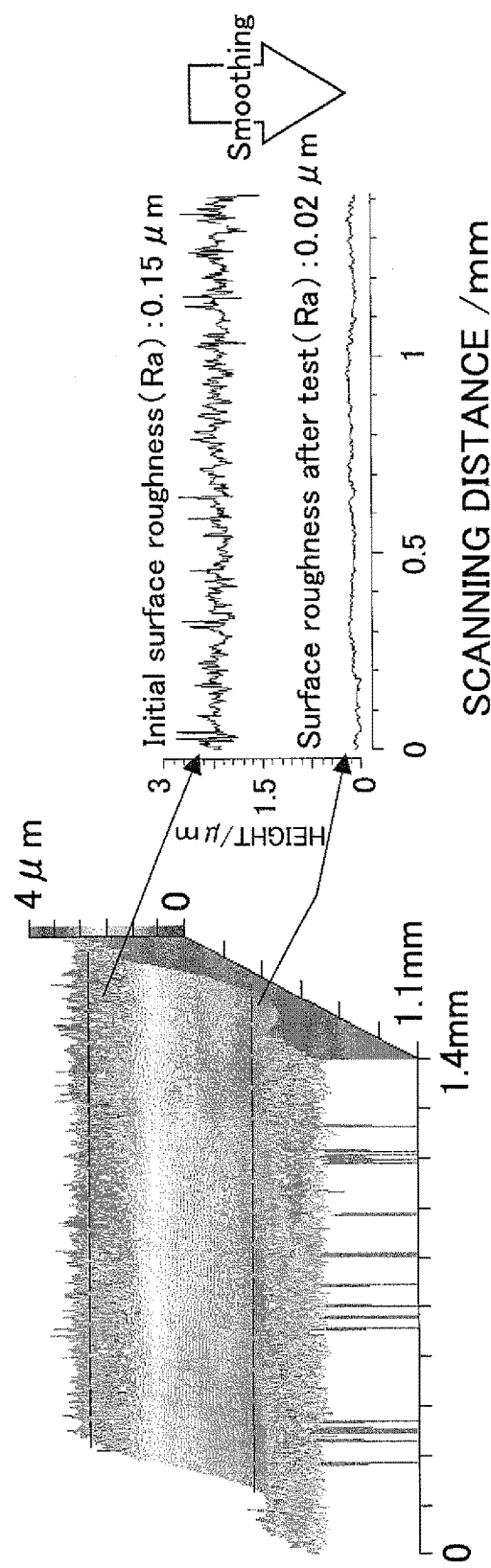
FIG. 8 is a diagram illustrating the sliding surface of Sample 2 after friction test.
Figure 9:
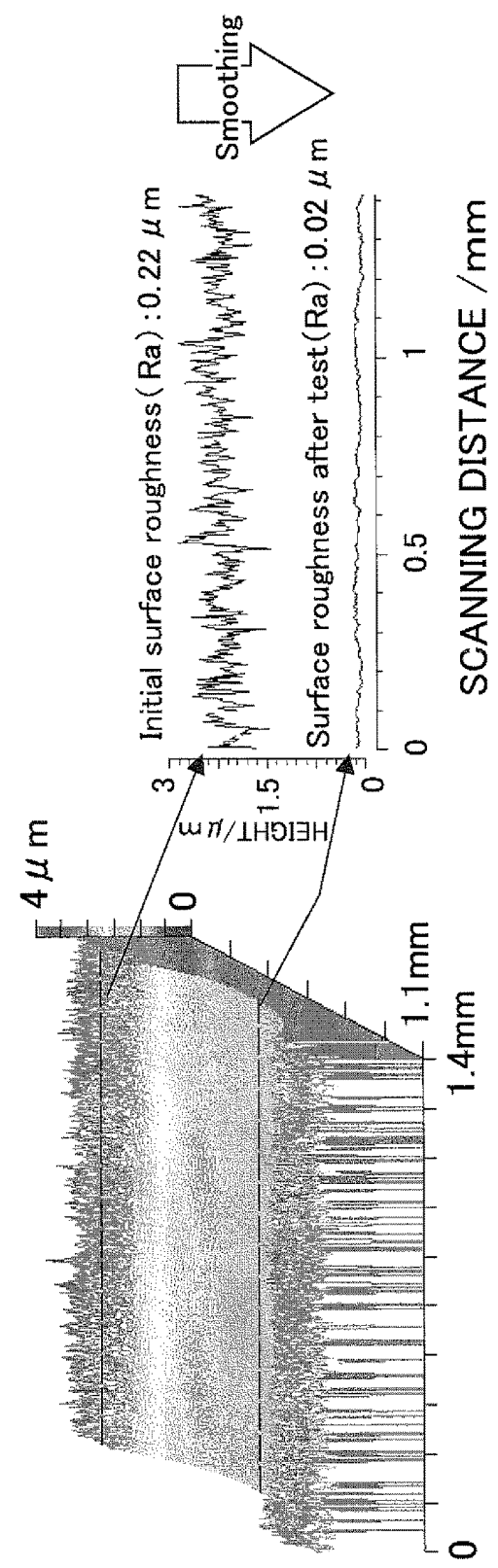
FIG. 9 is a diagram illustrating the sliding surface of Sample 3 after friction test.

FIG. 5A illustrates a relationship between the surface roughness (initial surface roughness) and the friction coefficient of the sliding surfaces (outermost layers) before the friction test, and FIG. 5B illustrates a relationship between the initial surface roughness and the wear depth. From these graphs, it is found that the friction coefficient and the wear depth tend to be small as the initial surface roughness is small. It is also found, however, that the comparison of Sample C4 or Sample C5 with Samples 1-4 shows that the friction coefficient is significantly different depending on the composition (B amount, H amount) of the B-DLC film constituting the sliding surface even with a comparable initial surface roughness.

FIG. 6 illustrates appearances of sliding surfaces of Sample 2, Sample C4 and Sample C5 after the friction test. It has been found that, in the case of a hard B-DLC film with a small amount of B and H as in Sample C4 and Sample C5, the slidability is poor largely due to the effect of the initial surface roughness, and the film delamination is likely to occur. It has also been found that, in the case of the specific B-DLC with a relatively large amount of B and H as in Sample 2, the smooth sliding surface is stably maintained even though the initial surface roughness is large, and the film delamination or the like does not occur.

(3) Change of Sliding Surface

FIG. 7 to FIG. 11 illustrate appearances of sliding surfaces of Samples 1-4 and Sample C4 before and after the friction test. In each figure, the 3D image illustrated at the left-hand side and the surface roughness curves in the 3D image cross-section illustrated at the right-hand side are rendered through the measurement using the white light interferometric non-contact surface profiler.

As apparent from FIG. 7 to FIG. 10, the sliding surface (B-DLC film) according to Samples 1-4 changes into an outer shape depending on the counterpart sliding material (in other words, fits to the surface of the counterpart sliding material) even though the initial surface roughness before the friction test is large, and a considerably low friction property can be exhibited. In contrast, as apparent from FIG. 11, the sliding surface (B-DLC film) according to Sample C4 has a less smoothed sliding surface during the sliding, so that the friction coefficient is less likely to decrease even though the initial surface roughness is smaller than those of Samples 2-4.

(4) Relationship Between Layer Thickness and Friction Coefficient

Figure 12:
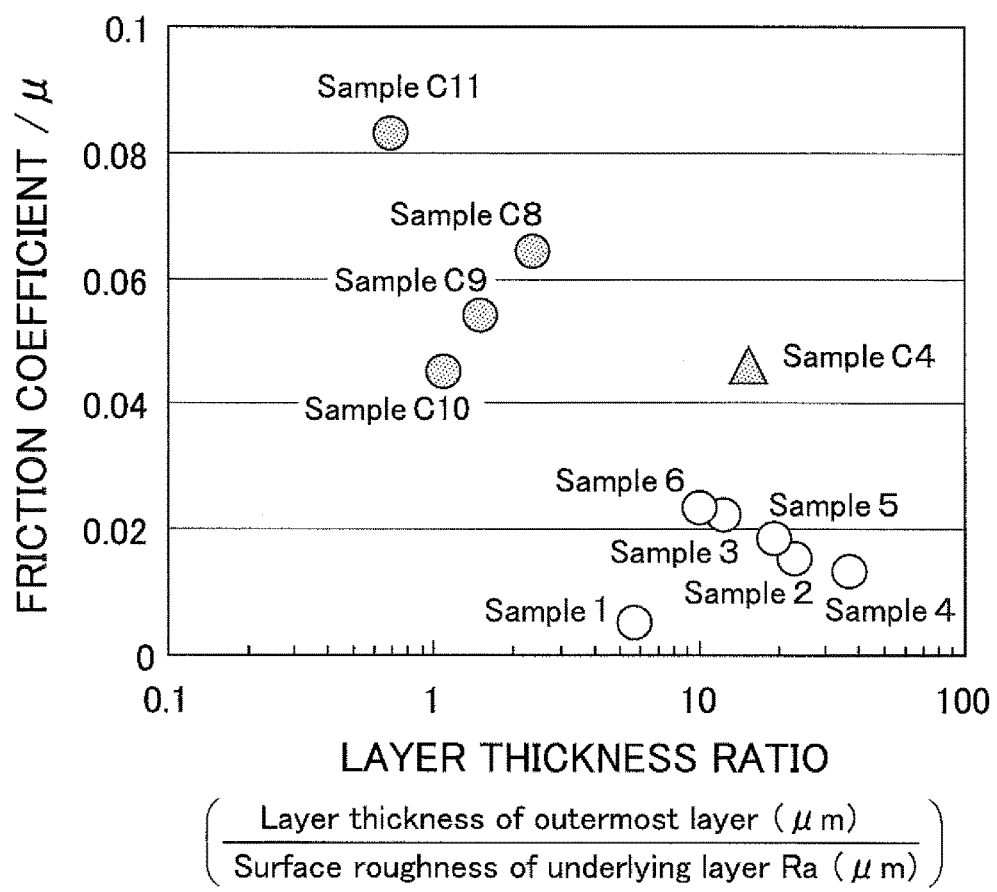
FIG. 12 is a dispersion diagram illustrating a relationship between the layer thickness ratio and the friction coefficient at sliding surfaces.

FIG. 12 illustrates a relationship between the layer thickness ratio and the friction coefficient of Samples 1-4, and Samples C4 and C8-C11. It is found from FIG. 12 that the low friction can sufficiently be achieved when the layer thickness ratio is within an appropriate range as in Samples 1-4. It is also found, however, that the low friction cannot sufficiently be achieved with the hard B-DLC single layer film even though the layer thickness ratio is within an appropriate range as in Sample C4.

As described above, it has been confirmed that there can be obtained a sliding member which can achieve both of the low friction property and the wear resistance property at a higher level, by providing the sliding surface with the laminated film comprising: the outermost layer comprising the specific B-DLC which contains relatively large amount of B and H; and the underlying layer which is excellent in the wear resistance property or the slidability.

Figure 10:
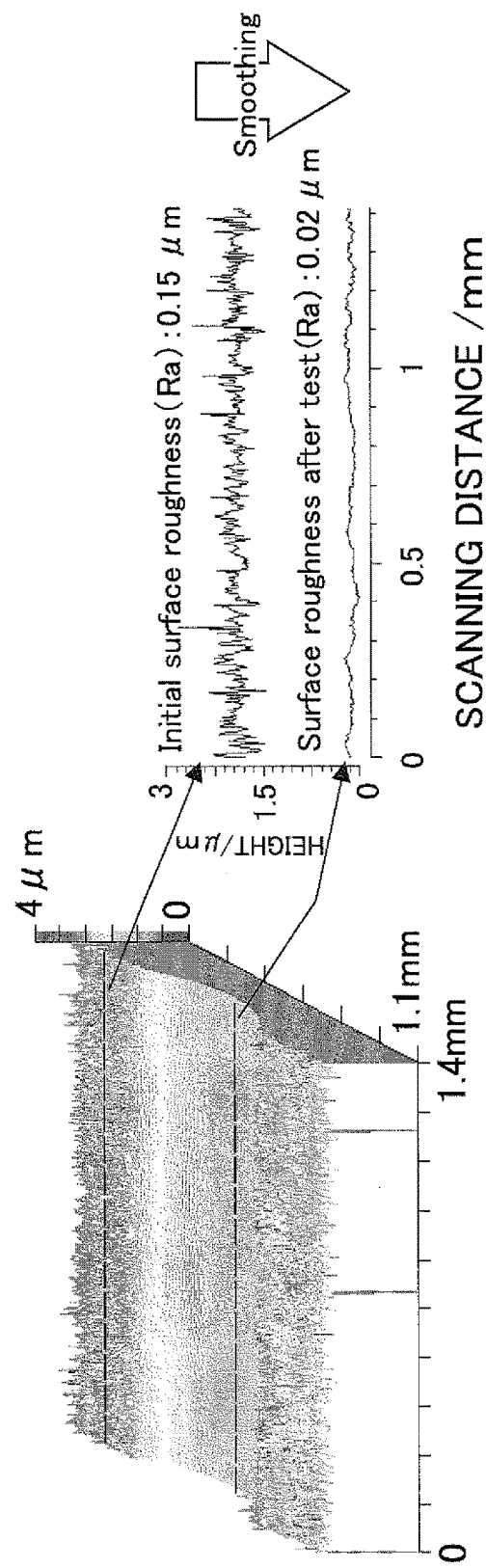
FIG. 10 is a diagram illustrating the sliding surface of Sample 4 after friction test.
Figure 11:
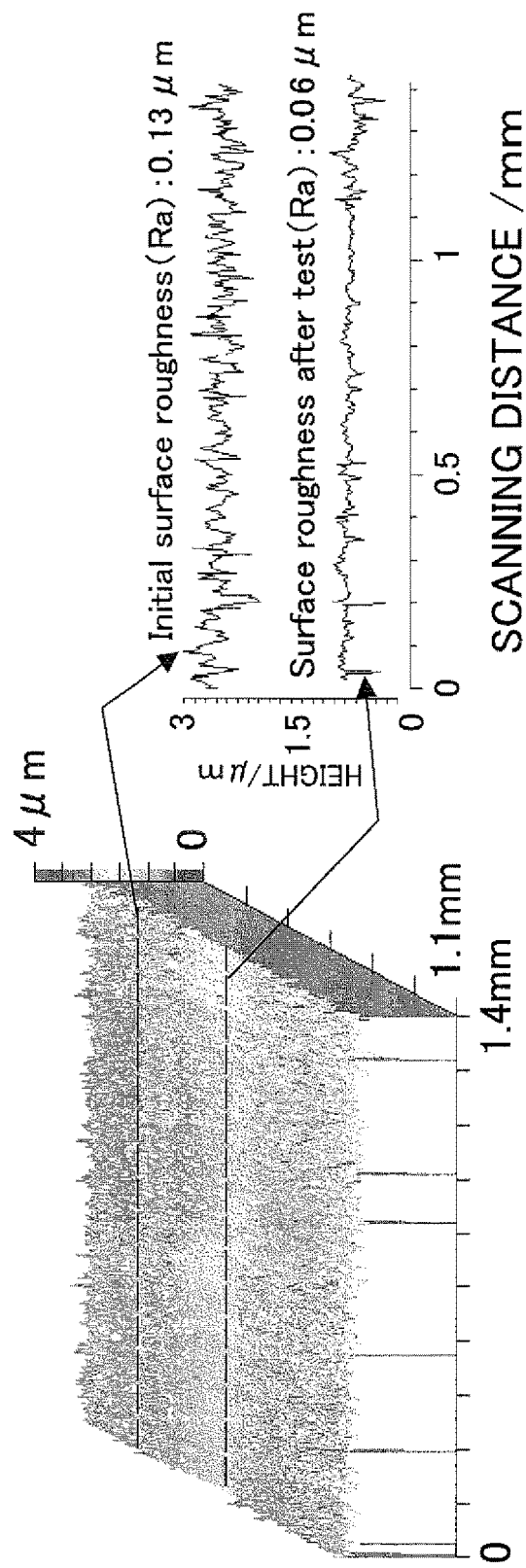
FIG. 11 is a diagram illustrating the sliding surface of Sample C4 after friction test.
Figure 13:
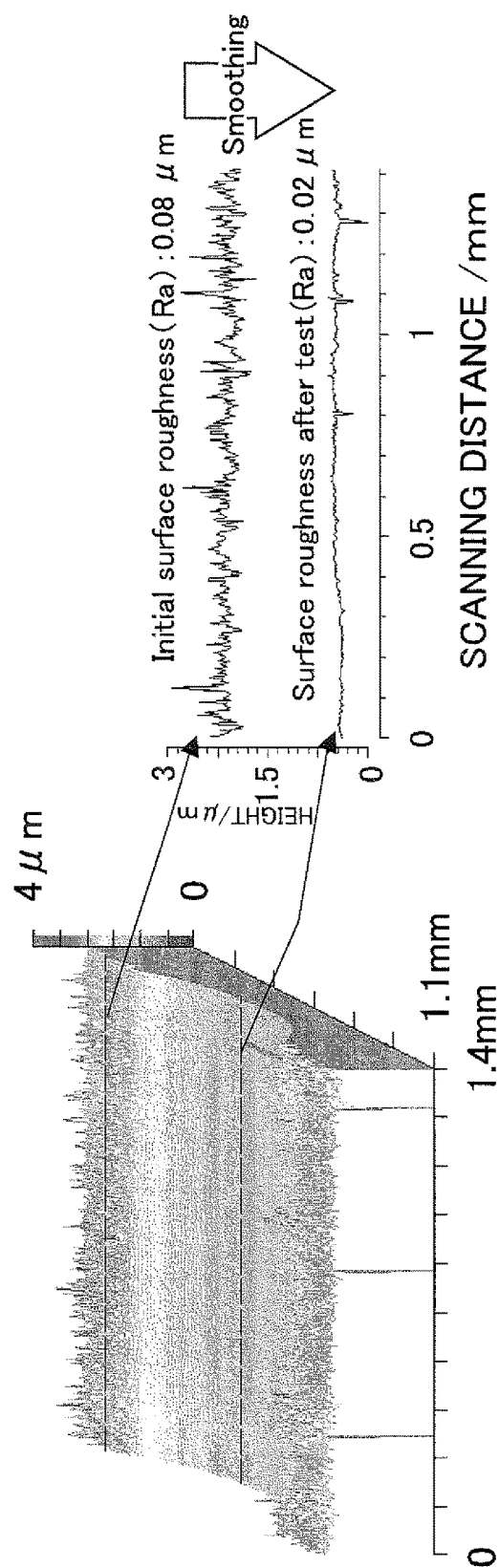
FIG. 13 is a diagram illustrating the sliding surface of Sample 5 after friction test.
Figure 14:
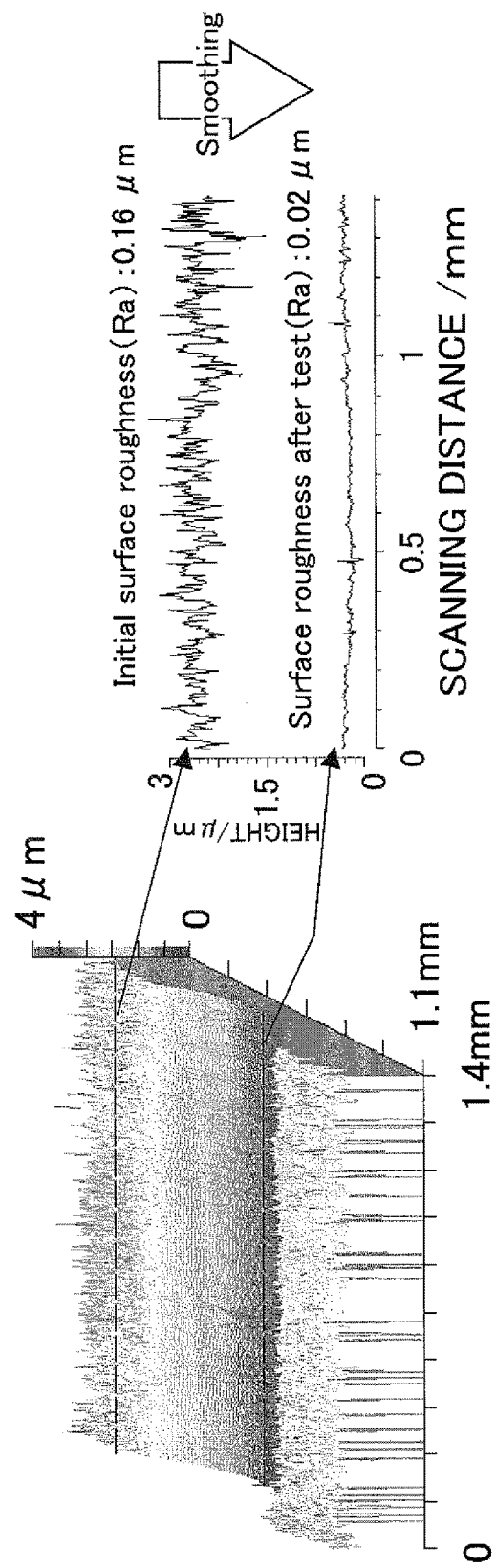
FIG. 14 is a diagram illustrating the sliding surface of Sample 6 after friction test.

As found from Table 1B, the above advantages are obtained not only in the cases of Samples 1-4 where the underlying layer is a Si-DLC film but in the cases of Samples 5 and 6 where the underlying layer is a TiN film. Specifically, FIG. 13 and FIG. 14 illustrate appearances of sliding surface of Sample 5 and Sample 6 before and after the friction test in the same manner to the Sample 4 (FIG. 10). As apparent from the above, even in the cases of underlying layer is TiN film, sliding surface (B-DLC film) fits to the counterpart sliding material, and a considerably low friction property can be exhibited. Also FIG. 12 illustrates a relationship between the layer thickness and the friction coefficient of Sample 5 and Sample 6. It is found from FIG. 12 that the low friction can sufficiently be achieved when the layer thickness ratio is within an appropriate range as Sample 5 and Sample 6 with the outmost layer comprising the specific B-DLC.

TABLE 1A

| Sample No. | Structure of sliding surface | Film forming conditions ||||| Synthetic temperature (° C.) | Synthetic time (min) | Composition of each layer (the balance: C/at %) ||| Properties of sliding surface Surface roughness Ra (μm) |||
|---|---|---|---|---|---|---|---|---|---|---|---|---|---|---|
| | | Gas introduction amount (sccm) ||||| | | | | | Outer most layer (initial) | Underlying layer | Base material (SUS440C) |
| | | TEB | TMS | CH₄ | Ar | H₂ | | | B | Si | H | R1 | R2 | R0 |
| 1 | Outermost layer | 12 | — | — | 30 | 30 | 295 | 6 | 28 | — | (30) | 0.12 | 0.12 | 0.01 |
| | Underlying layer | — | 2 | 100 | 45 | 45 | 475 | 30 | — | 6 | 28 | | | |
| 2 | Outermost layer | 12 | — | — | 30 | 30 | 340 | 40 | 31 | — | (30) | 0.15 | 0.12 | 0.01 |
| | Underlying layer | — | 4 | 100 | 45 | 45 | 505 | 20 | — | 6 | 28 | | | |
| 3 | Outermost layer | 12 | — | — | 30 | 30 | 340 | 40 | 31 | — | (30) | 0.23 | 0.23 | 0.13 |
| | Underlying layer | — | 4 | 100 | 45 | 45 | 505 | 20 | — | 6 | 28 | | | |
| 4 | Outermost layer | 4 | — | 24 | 30 | 30 | 320 | 100 | 24 | — | 33 | 0.15 | 0.12 | 0.01 |
| | Underlying layer | — | 4 | 100 | 45 | 45 | 500 | 20 | — | 6 | 28 | | | |
| C1 | No costing | | | — | | | | | | — | | | — | 0.01 (SCM420) |
| C2 | Single layer | — | 4 | 100 | 45 | 45 | 515 | | — | 6 | 28 | 0.14 | — | 0.01 |
| C3 | Single layer | — | 4 | 100 | 45 | 45 | 515 | | — | 6 | 28 | 0.20 | — | 0.13 |
| C4 | Single layer | | | — | | | 200 | | 8 | — | 18 | 0.13 | 0.13 | 0.13 |
| C5 | Single layer | | | — | | | 200 | | 8 | — | 18 | 0.18 | 0.16 | 0.16 |
| C6 | Single layer | | | — | | | | | | — | | 1.48 | — | 0.01 |
| C7 | Single layer | 12 | — | — | 30 | 30 | 330 | 35 | 28 | — | 30 | 0.17 | — | 0.01 |
| C8 | Outermost layer | 12 | — | — | 30 | 30 | 460 | 5 | 27 | — | Not measured | 0.17 | 0.17 | 0.13 |
| | Underlying layer | — | 2 | 100 | 45 | 45 | 490 | 30 | — | 6 | 28 | | | |
| C9 | Outermost layer | 12 | — | — | 30 | 30 | 460 | 5 | 27 | — | Not measured | 0.27 | 0.27 | 0.25 |
| | Underlying layer | — | 2 | 100 | 45 | 45 | 490 | 30 | — | 6 | 28 | | | |
| C10 | Outermost layer | 12 | — | — | 30 | 30 | 455 | 5 | 27 | — | Not measured | 0.37 | 0.37 | 0.36 |
| | Underlying layer | — | 4 | 100 | 45 | 45 | 485 | 30 | — | 6 | 28 | | | |
| C11 | Outermost layer | 12 | — | — | 30 | 30 | 455 | 5 | 27 | — | Not measured | 0.61 | 0.61 | 0.64 |
| | Underlying layer | — | 4 | 100 | 45 | 45 | 485 | 30 | — | 6 | 28 | | | |

| Sample No. | Structure of sliding surface | Properties of sliding surface ||| Results of friction test || Notes |
|---|---|---|---|---|---|---|---|
| | | Layer thickness (μm) T1: Outermost layer T2: Underlying layer | | Layer thickness ratio T1/R2 | Friction coefficient μ | Wear depth (μm) | |
| 1 | Outermost layer | 0.7 | | 5.8 | 0.005 | 0.7 | Underlying layer is equivalent to Si-DLC film of Sample C2 |
| | Underlying layer | 1.7 | | | | | |
| 2 | Outermost layer | 2.8 | | 23.3 | 0.015 | 1.6 | Underlying layer is equivalent to Si-DLC film of Sample C2 |
| | Underlying layer | 2.0 | | | | | |
| 3 | Outermost layer | 2.9 | | 12.6 | 0.022 | 1.4 | Underlying layer is equivalent to Si-DLC film of Sample C2 |
| | Underlying layer | 2.0 | | | | | |

TABLE 1A-continued

| | | | | | | | |
|---|---|---|---|---|---|---|---|
| | 4 | Outermost layer | 4.5 | 37.5 | 0.013 | 1.2 | Underlying layer is equivalent to Si-DLC film of Sample C2 |
| | | Underlying layer | 2.0 | | | | |
| | C1 | No costing | — | — | 0.055 | 1.6 | Sliding surface is base material surface itself |
| | C2 | Single layer | 2.1 | — | 0.023 | 0.3 | Si-DLC |
| | C3 | Single layer | 2.1 | — | 0.039 | 0.2 | Si-DLC |
| | C4 | Single layer | 3.5 | 15.4 | 0.046 | 0.2 | Sputtered B-DLC |
| | C5 | Single layer | 3.5 | 12.5 | Delaminated | | Sputtered B-DLC |
| | C6 | Single layer | 12.0 | — | Wore away | | Molybdenum disulfide-based costing |
| | C7 | Single layer | 2.8 | — | 0.004 | 2.4 | B-DLC |
| | C8 | Outermost layer | 0.4 | 2.4 | 0.064 | 0.4 | |
| | | Underlying layer | 1.8 | | | | |
| | C9 | Outermost layer | 0.4 | 1.5 | 0.054 | 0.7 | |
| | | Underlying layer | 1.8 | | | | |
| | C10 | Outermost layer | 0.4 | 1.1 | 0.045 | 1 | |
| | | Underlying layer | 1.8 | | | | |
| | C11 | Outermost layer | 0.4 | 0.7 | 0.083 | 1.64 | |
| | | Underlying layer | 1.8 | | | | |

Note
1) Surface roughness (Ra) was measured using a white light interferometric non-contact surface profiler (New View 5022 available from Zygo Corporation).
Note
2) Film thickness was measured using an accurate film thickness measuring apparatus (CALOTEST available from CSEM Instruments SA).
Note
3) B content and Si content were measured by EPMA analysis (JXA-8200 available from JEOL Ltd).
Note
4) H content was measured by RBS/HFS analysis (Pelletron 3SDH available from National Electrostatics Corporation).
Note
5) Values in parentheses are estimated values.

TABLE 1B

| | | Film forming conditions | | | | | | Composition of each layer (the balance: C/at %) | | | Properties of sliding surface Surface roughness Ra (μm) | | |
|---|---|---|---|---|---|---|---|---|---|---|---|---|---|
| Sample No. | Structure of sliding surface | Gas introduction amount (sccm) | | | | Synthetic temperature (° C.) | Synthetic time (min) | | | | Outer most layer (initial) R1 | Underlying layer R2 | Base material (SUS440C) R0 |
| | | TEB | TiCl$_4$ | N$_2$ | Ar | H$_2$ | | | B | Si | H | | | |
| 5 | Outermost layer | 12 | — | — | 30 | 30 | 370 | 30 | 26 | — | 29 | 0.08 | 0.12 | 0.01 |
| | Underlying layer | — | 2 | 10 | 30 | 45 | 585 | 80 | — | — | — | | | |
| 6 | Outermost layer | 12 | — | — | 30 | 30 | 370 | 30 | 26 | — | 29 | 0.16 | 0.23 | 0.01 |
| | Underlying layer | — | 2 | 10 | 30 | 45 | 585 | 80 | — | — | — | | | |

| Sample No. | Structure of sliding surface | Properties of sliding surface Layer thickness (μm) T1: Outermost layer T2: Underlying layer | Layer thickness ratio T1/R2 | Results of friction test Friction coefficient μ | Wear depth (μm) | Notes |
|---|---|---|---|---|---|---|
| 5 | Outermost layer | 2.3 | 19.2 | 0.019 | 1.5 | Underlying layer is TiN film |
| | Underlying layer | 1.3 | | | | |

TABLE 1B-continued

| | | | | | | |
|---|---|---|---|---|---|---|
| 6 | Outermost layer | 2.3 | 10.0 | 0.023 | 1.9 | Underlying layer is TiN film |
| | Underlying layer | 1.3 | | | | |

Note
1) Surface roughness (Ra) was measured using a white light interferometric non-contact surface profiler (New View 5022 available from Zygo Corporation).

Note
2) Film thickness was measured using an accurate film thickness measuring apparatus (CALOTEST available from CSEM Instruments SA).

Note
3) B content and Si content were measured by EPMA analysis (JXA-8200 available from JEOL Ltd).

Note
4) H content was measured by RBS/HFS analysis (Pelletron 3SDH available from National Electrostatics Corporation).

Note
5) Values in parentheses are estimated values.

TABLE 2

| | Gas introduction amount (sccm) | | | Chamber inner pressure | Base material temperature | Applied voltage |
|---|---|---|---|---|---|---|
| | $H_2$ | $N_2$ | Ar | (Pa) | (° C.) | (V) |
| Discharge heating | 40 | — | — | 150 | — | 300 |
| Ion nitriding | 40 | 500 | — | 320 | 500 | 390 |
| Pre-sputtering | 50 | — | 50 | 550 | 500 | 270 |

The invention claimed is:

1. A sliding member comprising:
   a base material; and
   a sliding film that covers a surface of the base material and constitutes a sliding surface,
   the sliding member being used under a wet condition where lubricant oil exists,
   the sliding film comprising a laminated film,
   the laminated film comprising:
      an underlying layer formed on the surface of the base material; and
      an outermost layer formed at least on a part of the underlying layer,
   the outermost layer comprising specific boron-containing amorphous carbon (referred hereinafter to as a "specific B-DLC"), the specific B-DLC containing 4-50 at % (referred simply to as "%") boron (B) and 26-50% hydrogen (H) when the outermost layer as a whole is 100%,
   the sliding member having a layer thickness ratio (T1/R2) of 3-200, wherein the layer thickness ratio (T1/R2) is defined as a ratio of a layer thickness (T1) of the outermost layer to a surface roughness (R2) based on an arithmetic average roughness (Ra) of the underlying layer.

2. The sliding member as recited in claim 1, wherein the layer thickness ratio is 5.8-37.5.

3. The sliding member as recited in claim 2, wherein the layer thickness ratio is 12.6-23.3.

4. The sliding member as recited in claim 1, wherein the outermost layer comprises a specific B-DLC that contains 23-50% B when the outermost layer as a whole is 100%.

5. The sliding member as recited in claim 1, wherein the underlying layer comprises nitride, carbide or hard amorphous carbon harder than the outermost layer.

6. The sliding member as recited in claim 5, wherein the hard amorphous carbon of the underlying layer is silicon-containing amorphous carbon (referred hereinafter to as a "Si-DLC") that contains silicon (Si).

7. The sliding member as recited in claim 1, wherein the surface roughness of the underlying layer is 0.1 micrometers or more as the Ra.

8. A sliding machine comprising:
   a pair of sliding members having sliding surfaces that face each other and can relatively move; and
   lubricant oil that can be interposed between the sliding surfaces facing each other,
   at least one of the sliding members comprising the sliding member as recited in claim 1.

* * * * *